Dec. 24, 1940.        G. T. JACOCKS        2,226,496
METHOD OF ATTACHING NOZZLES
Filed Sept. 19, 1939
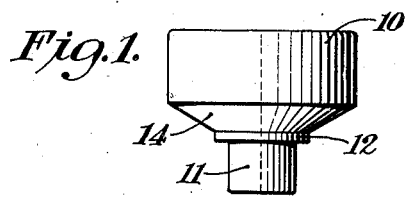
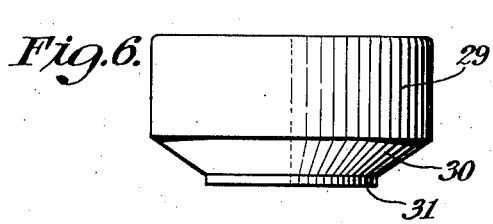
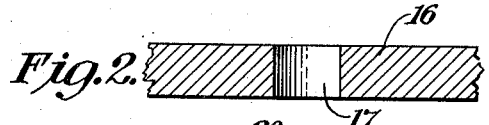
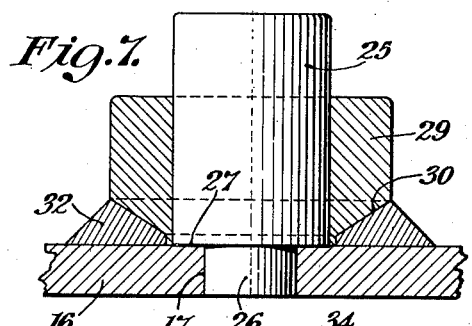
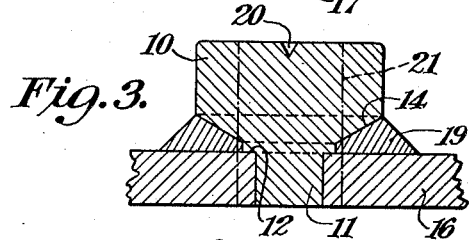
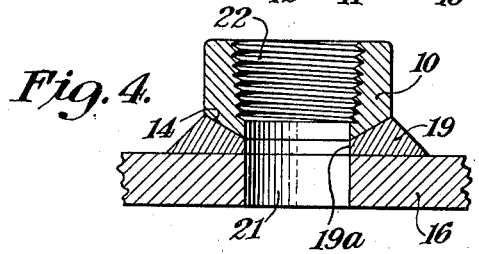
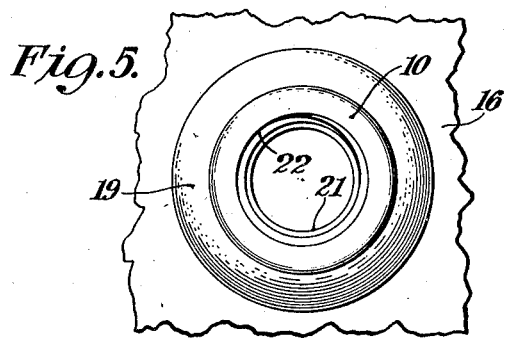
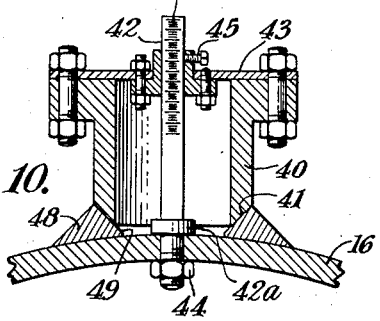
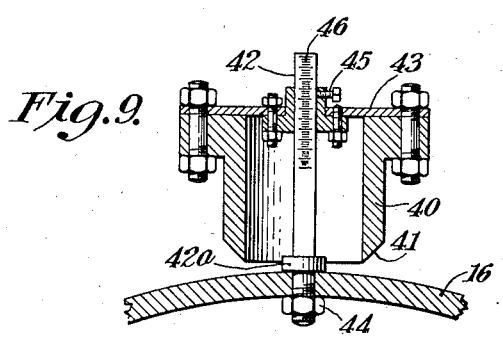
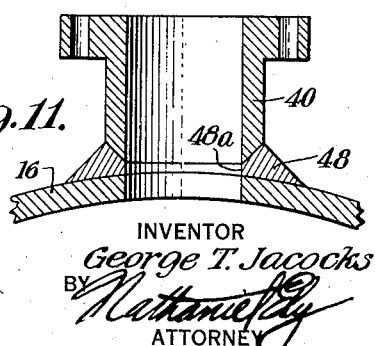
INVENTOR
George T. Jacocks
BY
ATTORNEY Patented Dec. 24, 1940

2,226,496

UNITED STATES PATENT OFFICE 2,226,496

METHOD OF ATTACHING NOZZLES

George T. Jacocks, Larchmont, N. Y., assignor to The Lummus Company, New York, N. Y., a corporation of Delaware Application September 19, 1939, Serial No. 295,586

3 Claims. (Cl. 29—148.2)

This invention relates to improvements in the method for securing nozzles to thin wall vessels, pipes, tanks, and the like.

It is essential in securing nozzles or transverse pipes to thin wall vessels, such as tanks, pipes, etc. that the nozzle be leak proof, sufficiently strong, so that it will withstand the necessary service and, in addition, be at the desired location. In many cases it is necessary to add substantial metal adjacent the opening in the vessel, for the required strength, and it has been suggested that welding aids be added in the nature of fittings.

The principal feature of the invention is to secure nozzles or pipes to thin wall vessels or other pipes with considerable accuracy, with a minimum of shop labor, and with entirely sound welds which will meet all requirements of the technical codes for soundness and strength.

More particularly, this is accomplished by a series of operations including the use of locating jig members which permit the accurate location of the nozzle and permit drilling and tapping after the welding has been accomplished.

Further objects and advantages of the invention will appear from the following disclosure of preferred forms of embodiment thereof, taken in connection with the attached drawing, in which Fig. 1 is an elevation of one form of welding aid;

Fig. 2 is a cross section of a wall of a thin wall vessel apertured to receive the welding aid of Fig. 1;

Fig. 3 is a cross section of the welding aid secured to the thin wall vessel;

Fig. 4 is a vertical section showing the tapped nozzle;

Fig. 5 is a plan view of the nozzle;

Fig. 6 is an elevation of a modified form of welding aid;

Fig. 7 is a composite view with parts in cross section showing the welding aid in secured position on the thin wall vessel;

Fig. 8 is a vertical section of the nozzle construction after drilling;

Fig. 9 is a cross section of a modified form of nozzle supported by a jig;

Fig. 10 is a cross section similar to Fig. 9 showing the nozzle after welding;

Fig. 11 is a cross section of the completed nozzle construction.

In accordance with a preferred form of embodiment of my invention, I have provided simplified means for securing screw threaded or flanged nozzles to relatively thin wall vessels where the vessels are of such thinness or shape that it would be impractical to make the connection directly to the metal. As shown in Figs. 1 to 5 inclusive, one method of securing threaded nozzles to such vessels includes the provision of a welding aid or adapter 10 having a centering or guide portion 11, a shoulder 12 and a tapered portion 14.

This adapter is first centered in the desired location in the wall of vessel 16 by drilling a hole 17 into which the centering or guide portion 11 is placed. In such position, as shown in Fig. 3, the shoulder portion 12 rests on the wall 16 and the tapered portion 14 forms a recess with the wall 16 into which welding material 19 is deposited. A complete attachment of the welding aid or adapter to the wall is thereby made.

The adapter is conveniently provided with a center mark 20 and is adapted to be drilled as along the dotted lines 21, which are at a sufficient diameter corresponding with the root diameter of the ultimate thread. This drilling will also pass through the inner edge of the welding material 19 so that the weld will be exposed as at 19a. This assures a clean weld and makes inspection possible.

The completed nozzle is shown in Fig. 4 with the inner wall 19a of welding material exposed. The nozzle may be suitably tapped as at 22 and is adequate for attachment of pipes, plugs, etc. The adapter 10 thus becomes the nozzle and is completely surrounded and attached by the welding material 19. The centering portion 11 of the adapter is removed in this case by the drilling operation.

In Figs. 6, 7 and 8, a slightly modified form of embodiment of the invention is shown. In this case, the thin wall body 16 is similarly apertured at 17 to receive a centering device. In this case, however, an independent centering plug 25 is used and such plug has a centering portion 26. The shoulder 27 adjacent portion 26 rests directly on the plate 16.

The centering plug serves to center the nozzle body 29, which also may be termed a welding aid or adapter. This is shown in Fig. 6, and is provided with the tapered portion 30 and a shoulder 31. As shown in Fig. 7, the adapter 29 rests on the plate 16 with the shoulder 31 in contact. It is then welded as indicated at 32 along the wall of the tapered portion 30. The adapter is thus firmly secured to the vessel wall 16 and the centering plug 25 can then be removed.

The drilled nozzle is shown in Fig. 8 with the hole 34 of such diameter that it exposes the weld 32 at 32a. As in the prior case, this assures a satisfactory weld subject to a close inspection. The nozzle may then be tapped as shown in Fig. 4. This construction avoids the drilling out of large quantities of metal as the block 25 may be removed after the nozzle is in position. It is preferable in connection with large nozzles.

Another form of construction for flange nozzles is shown in Figs. 9, 10 and 11. In this case the nozzle body is suitably tapered at 41 and is held spaced from the body 16 by a jig, which includes a centering pin 42. The pin may be provided with a shoulder 42a near the end which rests on the plate 16, and the end of the pin which extends into the plate may be bolted as at 44.

A cross piece 43 is conveniently provided with a hub 45, which may be adjustably mounted on the pin 42, such pin being calibrated at 46 to indicate the proper height that the nozzle 40 is spaced from the plate 16. This cross piece 43 is suitably bolted to the flanges of the nozzle and will hold the nozzle in a centered and fixed position during application of the weld material.

As shown in Fig. 10, the nozzle is welded as at 48 to the plate, with some of the weld material carrying into the interior to the bore of the nozzle as at 49. In this case the bore of the nozzle is already fixed and, after the nozzle has been completely secured, it is merely necessary to remove the jig, and, using the nozzle as a guide, to drill out the excess welding material and the desired size opening in the shell. The finished nozzle is shown in Fig. 11, and here again the weld 48 is clearly exposed as at 48a with the unsound material removed by the drilling operation.

In each case a centering operation is established by a pilot hole and a centering jig which rigidly locates the nozzle until it is completely welded. Thereafter, the centering element is removed and the nozzle bore as well as the vessel are simultaneously drilled to form a continuous opening of uniform diameter and such drilling also removes the unsound penetrating portion of the weld. The nozzle is spaced from but fully welded to the wall and will always have the desired angularity and location with respect to the vessel. Attachment is relatively rapid as there are a minimum of operations and the operator need not hold the parts to be welded.

The device is of considerable value with respect to any type of vessel to which nozzles are to be attached, and it is of particular importance in connection with thin wall vessels, such as heat exchangers, which require large nozzles. It will also be understood that the element 16 is referred to as a plate and where the nozzle is relatively small, with respect to the curvature of the plate, it may be considered as flat. It is also to be understood, however, that in some cases the size of the bore in the nozzle is as large or larger than the diameter of the attaching vessel as in the case of securing one pipe to another, and in such case the plate is curved. As the method of securing the nozzle is the same, the relative curvature of the plate is not a limiting feature.

While a preferred form of embodiment of the invention has been shown and described, modifications may be made thereto, and it is, therefore, the desire to obtain a broad interpretation of the invention within the scope and spirit of the description herein and of the claims hereinafter set forth.

I claim:

1. The method of attaching a nozzle to a vessel which comprises forming a centering hole in the vessel, centering the nozzle by means of a centering support positioned through the said nozzle and in said hole, said hole being of smaller diameter than the said nozzle with respect to said hole, welding said nozzle around its periphery to said vessel, removing the centering support and enlarging the opening in the nozzle sufficient to expose and remove some of the internal welded material.

2. The method of attaching a cylindrical nozzle element to a predetermined position on a relatively thin-walled vessel, which comprises forming a centering hole in the wall of the vessel at the predetermined point, supporting said nozzle element with respect to said hole, said nozzle element having a bevel forming an outwardly opened pocket with said vessel wall, welding said nozzle element by depositing weld material in said pocket to substantially fill said pocket, and subsequently increasing the internal diameter of said nozzle element and the size of said hole in said vessel wall by removing metal therefrom, the amount of metal removed being sufficient to cut into the pocket from the inside and remove a substantial portion of the weld material from the interior of the weld.

3. The method of attaching a cylindrical nozzle element to a predetermined position on a relatively thin-walled vessel, which comprises forming a centering hole in the wall of the vessel at the predetermined point, supporting said nozzle element with respect to said hole, said nozzle element having a bevel forming an outwardly opened pocket with said vessel wall, welding said nozzle element by depositing weld material in said pocket to substantially fill said pocket, and simultaneously increasing the entire internal diameter of said nozzle element and the size of said hole in said vessel wall by removing metal therefrom, the amount of metal removed being sufficient to cut into the pocket from the inside and remove a substantial portion of the weld material from the interior of the weld, the diameter of said nozzle and vessel opening being the same.

GEORGE T. JACOCKS.